July 18, 1972     JINSHICHI NAKA ET AL     3,677,773
METHOD FOR THE PRODUCTION OF A FLAVOR ENHANCING CRYSTAL
Filed Sept. 2, 1965
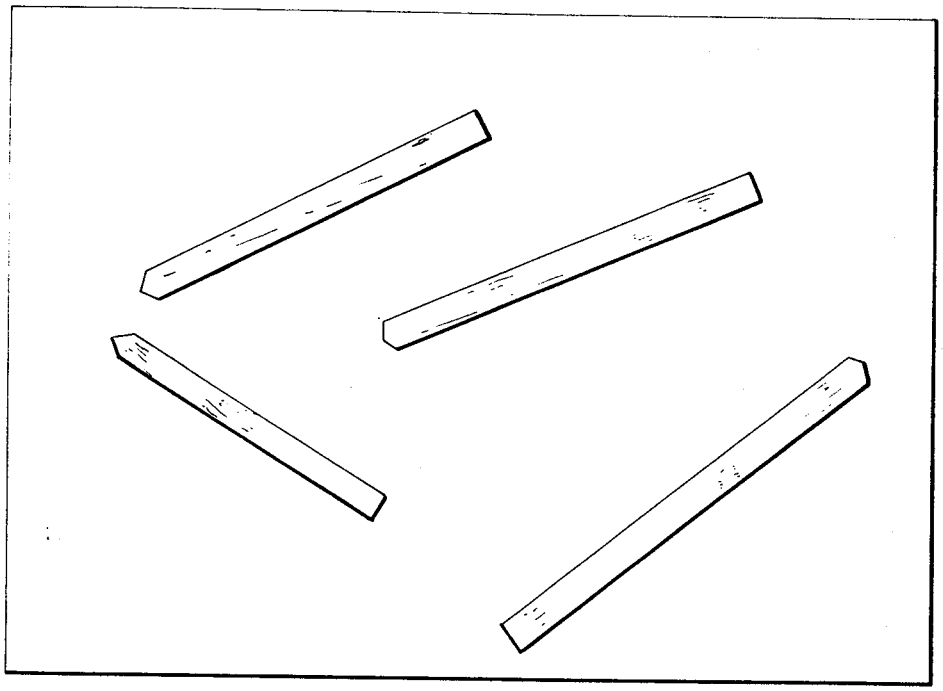
INVENTORS
Jinshichi Naka,
Yasunori Tokuda,
Takehiko Koono and
Jun Utsugi
BY Wenderoth, Lind and Ponack
ATTORNEYS 3,677,773
METHOD FOR THE PRODUCTION OF A FLAVOR
ENHANCING CRYSTAL
Jinshichi Naka, Toyonaka, Yasunori Tokuda, Takasago, Takehiko Koono, Kobe, and Jun Utsugi, Kakogawa, Japan, assignors to Takeda Chemical Industries, Ltd., Osaka, Japan
Continuation-in-part of application Ser. No. 383,506, July 17, 1964. This application Sept. 2, 1965, Ser. No. 484,693
Claims priority, application Japan, Mar. 29, 1965, 40/18,216
Int. Cl. A23l 1/22
U.S. Cl. 99—140 N                                                    4 Claims The present application is a continuation-in-part of copending application Ser. No. 383,506, filed July 17, 1964 now abandoned.

This invention relates to a method for the production of a flavor enhancer. More particularly, this invention relates to a method for the production of crystalline flavor-enhancing material consisting substantially of from 2 to 10% by weight, on anhydrous basis, of disodium salt of flavorous 5'-nucleotide and the remainder being monosodium glutamate, and to the crystalline flavor-enhancing mass prepared by the said method.

Abbreviations "GA," "GMP," "IMP," "GMP-Na$_2$," "IMP-Na$_2$," "5'-nucleotide" and "MSG" appearing throughout this application stand respectively for "glutamic acid," "5'-guanylic acid," "5'-inosinic acid," "disodium 5'-guanylate," "disodium 5'-inosinate," "either or both of IMP and GMP," and "monosodium glutamate."

It has hitherto been known that, when 5'-nucleotide is employed together with GA, superior flavor-enhancing effect is obtainable due to the synergistic action between GA and 5'-nucleotide, in comparison with such cases where GA or 5'-nucleotide is used independently. At the present time, as a preferable type of condiments, a physical mixture of MSG and disodium salt of 5'-nucleotide is widely used.

These prior condiments have been prepared by such processes as the following:

(1) A hydrophilic organic solvent having dissolved therein disodium salt of 5'-nucleotide is sprayed onto the surface of MSG crystals, and then the MSG crystals so coated are dried;

(2) MSG crystals are subjected to film-coating with disodium salt of 5'-nucleotide in a fluidized bed; and (3) A granule-type condiment is prepared from the kneaded mixture of MSG and disodium salt of 5'-nucleotide.

In these processes, MSG and disodium salt of 5'-nucleotide are not always homogeneously mixed and the resulting products are not of fine appearance and are apt to be disintegrated by a mechanical shock. Moreover, in the known processes, the MSG and disodium salt of 5'-nucleotide are required to be purified prior to the use thereof as starting materials, and in most cases MSG is required to be in the form of crystals. It was, therefore, a long-cherished desideratum in the art to find and establish a method for producing fine and hard particles consisting of MSG and 5'-nucleotide in a desired ratio.

Under these circumstances, it was found by the present inventors that MSG and disodium salt of flavorous 5'-nucleotide (i.e. IMP-Na$_2$ and/or GMP-Na$_2$) can be incorporated together to form a homogeneous crystalline mass in spite of lack of similarity in their molecular structures. Further study by the inventors revealed that MSG and disodium salt of the 5'-nucleotide can exist in a metastable supersaturated state even in a mixture of water and a hydrophilic organic solvent without rapid precipitation; that the metastable supersaturated state is maintained in a wider range than that in water alone that the metastable supersaturated state can be obtained and maintained by preparing a hot aqueous solution of MSG and alkali salt of 5'-nucleotide at a temperature higher than 40° C., adding gradually from 10 to 75% by volume of a hydrophilic organic solvent to the hot solution under gentle stirring, and gradually lowering the temperature of the aqueous mixture at a rate of about 1 to 3° C. per hour; and that novel homogeneous crystalline masses are thus prepared in a good yield owing to the existence of the aforesaid metastable state in widened range.

It was also confirmed that the crystalline mass consists homogeneously of disodium salt of the 5'-nucleotide and MSG in an intended ratio, so that the resulting mass can contain from 2 to 10% by weight, on anhydrous basis, of disodium salt of the 5'-nucleotide.

It should be noted that said findings according to the present invention are beyond the common knowledge of artisans in this field in view of the following facts.

The following table shows approximate solubilities [1] of a mixture of MSG and disodium salt of 5'-nucleotide in a ratio 100:5 by weight in a mixed solvent of water and hydrophilic organic solvent.

TABLE 1

| Concentration of methanol (percent by volume*) | 25 | 50 | 75 |
|---|---|---|---|
| Temperature: | | | |
| 25° C., percent | 29 | 9 | 1 |
| 50° C., percent | 35 | 13 | 2 |
| 75° C., percent | 43 | a 23 | b 3 | a 70° C.   b 69° C.

*Throughout the specification, concentration of hydrophilic organic solvent is represented as the ratio of the volume of the hydrophilic organic solvent relative to the volume of hydrophilic organic solvent plus the volume of free water.

According to Table 1, the normal common sense expectation is that when a hydrophilic organic solvent, e.g. methanol, is added to an aqueous solution of MSG and alkali salt of 5'-nucleotide having e.g. more than 60% by weight concentration, precipitation will occur rapidly, regardless of the temperature of the solution, whereby MSG and 5'-nucleotide will separately precipitate.

An object of this invention is, therefore, to provide a method for preparing a novel crystalline flavor-enhancing mass consisting substantially of alkali salt of 5'-nucleotide and MSG. Another object is to provide a novel crystalline mass consisting substantially of (a) from 2 to 10% by weight, on anhydrous basis, of disodium salt of 5'-nucleotide and (b) MSG, and having a fine appearance and the desired mechanical strength and size for use as a condiment.

In this invention, the 5'-nucleotide is incorporated as substantially its disodium salt to give the crystalline mass, even when another alkali salt of 5'-nucleotide is employed as a starting material, because MSG is employed in much larger amount than the alkali salt of 5'-nucleotide.

The method of this invention is carried out by preparing a hot aqueous solution of alkali salt of 5'-nucleotide and MSG, adding thereto gradually a hydrophilic organic solvent under gentle stirring, and gradually lowering the temperature of the aqueous mixture.

As the alkali salt of 5'-nucleotide, there is employed water-soluble alkali salt of 5'-nucleotide such as sodium salt of IMP, potassium salt of IMP, ammonium salt of IMP, magnesium salt of IMP, sodium salt of GMP, potassium salt of GMP, ammonium salt of GMP, mixtures thereof, etc.

5'-nucleotide contaminated with flavorless pyrimidine type nucleotides such as cytidylic acid, uridylic acid, ---
[1] The approximate solubilities are represented as grams dissolved in 100 g. of solution.

thymidylic acid, etc. may similarly be employed in this invention successfully. That is, even when a mixture of pyrimidine type nucleotide and 5'-nucleotide is employed as the starting material, the crystalline mass of this invention is not substantially contaminated with pyrimidine type nucleotide. Therefore, in the method of this invention, there may be employed, if necessary, a nucleic acid hydrolyzate per se which contains 5'-nucleotide and pyrimidine type nucleotide in nearly the same amount. When the hydrolyzate of nucleic acid is employed as it is, the yield of the crystalline mass of this invention may occasionally be increased due to the effect of salting out with an occasional existence of inorganic material, e.g. sodium chloride. However, the crystalline mass of this invention is not contaminated with the inorganic material.

In the method of this invention, the initial concentration of the hot aqueous solution should be adjusted to 64 to 20% by weight, the ratio by weight of alkali salt of 5'-nucleotide relative to MSG being 2 to 12:100, and more preferably 62 to 40% by weight. The initial temperature at which the addition of hydrophilic organic solvent is effected, is adjusted to above 40° C. Generally, it is preferable that the hot aqueous solution be supersaturated before the hydrophilic organic solvent is added thereto. The supersaturated degree of the solution is further heightened by adding the hydrophilic organic solvent. The addition of hydrophilic organic solvent to the hot aqueous solution should be carried out dropwise under gentle stirring so as to avoid rapid change of reaction conditions including temperature, the concentration of hydrophilic organic solvent, etc.

As the hydrophilic organic solvent, there may, for example, be used methanol, ethanol, acetone, ethylene glycol, dioxane, dimethylformamide, dimethylsulfoxide or a mixture thereof. The optimum amount of hydrophilic organic solvent is in the range of 10 to 75% by volume, and especially 30 to 50% by volume.

Lowering of the temperature of so-prepared aqueous mixture, whereby metastable supersaturated state is broken, causes the crystalline mass of this invention to form and grow. The lowering of the temperature of the aqueous mixture should be adjusted to a rate of about 1 to 3° C. per hour. The lowering of the temperature of the aqueous mixture may be started during or after the addition of hydrophilic organic solvent, provided that the metastable supersaturated state is maintained and the temperature of the aqueous mixture is over 40° C., more desirably over 60° C., when the addition of hydrophilic organic solvent is finished. For this purpose, the addition of hydrophilic organic solvent may be carried out under pressure, if desired.

In the method of this invention, selection of optimum gradient of temperature and incessant and gentle stirring of the aqueous mixture consisting of MSG, alkali salt of 5'-nucleotide, water and hydrophilic organic solvent are especially important factors for the growth of the crystalline mass.

Thus, by the method mentioned above, the crystalline mass of this invention is prepared in a good yield. Table 2 shows the yield of the crystalline mass of this invention obtained by preparing a hot supersaturated aqueous solution of alkali salt of 5'-nucleotide and MSG—the concentration being 62% by weight wherein the ratio by weight of alkali salt of 5'-nucleotide relative to MSG is 5:100 and the temperature being higher than 75° C.—by adding methanol dropwise to the hot aqueous solution under gentle stirring and by lowering gradually the temperature of the aqueous mixture.

TABLE 2

| Concentration of methanol (percent by volume) | 25 | 50 | 75 |
|---|---|---|---|
| Temperature: | | | |
| 25° C., percent | 71.3 | 89.0 | 97.8 |
| 50° C., percent | 60.5 | 82.5 | 96.0 |
| 75° C., percent | 45.5 | a 73.1 | b 93.5 | a 70° C.   b 69° C.

Further, if desired, the aqueous mixture may be kept under pressure throughout the precipitation process, and/or the temperature lowered below the room temperature, so as to heighten the yield of the crystalline mass of this invention.

When the concentration of MSG and/or alkali salt of 5'-nucleotide in the aqueous hot solution is too low to obtain the product in a high yield, it is possible to improve the yield by adding under pressure a hydrophilic organic solvent having lower boiling point, e.g. methanol, at a temperature of over about 70° C.

By the above-mentioned method, there is produced a novel crystalline flavor-enhancing mass consisting substantially of disodium salt of flavorous 5'-nucleotide and MSG, both in hydrated form, and containing from 2 to 10% by weight, on anhydrous basis, of disodium salt of the flavorous 5'-nucleotide.

The crystalline mass of this invention is rod-shaped, glassy, hard, dry and of very good apperance (as is shown in the accompanying sheet of drawing).

The homogeneity of the crystalline mass of this invention is demonstrated by the following results:

(1) When a piece of the crystalline mass of this invention is subjected to paper chromatography and its absorption spectrum examined, it shows the absorption at the wave length of 253.6 mμ, which shows the presence of 5'-nucleotide in the crystalline mass. Further, the color reaction with ninhydrin gives the spot corresponding to that of MSG.

(2) It is observed under a polarizing microscope that the alkali salt of 5'-nucleotide is distributed homogeneously in the crystal lattice of the MSG.

(3) Any piece of the crystalline mass of this invention dissolves without forming precipitates perceivable even under a microscope, when treated with an aqueous solution of aluminum salt of calcium salt which is adjusted at about pH 6.

While aluminum salt or calcium salt of GA is soluble in water, aluminum salt or calcium salt of 5'-nucleotide is hardly soluble in water so that it forms white precipitates. For this reason, in known seasoning compositions wherein crystalline MSG is coated with alkali salt of 5'-nucleotide, inner aluminum salt or calcium salt of GA is dissolved away, while outer aluminum salt or calcium salt of 5'-nucleotide remains as precipitates, when treated with an aqueous solution of aluminum salt or calcium salt of pH 6. On the contrary, the crystalline mass of this invention dissolves in an aqueous solution of aluminum salt or calcium salt adjusted to pH 6 in the same way as MSG. This fact means that the 5'-nucleotide is homogeneously distributed in the crystalline mass of this invention as very fine particles of substantially molecular state.

Due to the fine homogeneous crystalline structure, the crystalline mass of this invention dissolves in water more quickly than known seasoning compositions such as a mixture of MSG and 5'-nucleotide or coated MSG with alkali salt of 5'-nucleotide, which serves to intensify the flavorous taste of the crystalline mass of this invention. Table 3 shows the result comparing the time required for dissolution between the crystalline mass of this invention and a known seasoning composition having the same degree of size, respectively.

TABLE 3

| | Minutes | | |
|---|---|---|---|
| | Test 1 | Test 2 | Test 3 |
| Sample A | 12 | 3.5 | 8 |
| Sample B | 5 | 1.6 | 1.5 |
| Sample C | 11 | 2.5 | 5 |

Sample A: A mixture of crystalline alkali salt of 5'-nucleotide and MSG.
Sample B: The crystalline mass of this invention.
Sample C: Coated MSG with alkali salt of 5'-nucleotide.

Test 1 shows the time required for dissolution of 0.1 g. of the sample in 10 ml. of water without stirring.

Test 2 shows the time required for dissolution of 0.1 g. of the sample in 10 ml. of water under stirring every 30 seconds.

Test 3 shows the time required for dissolution of 0.1 g. of the sample in 20 ml. of soy sauce under stirring every 30 seconds.

The crystalline mass of this invention has its mesh size ranging from 20 to 200, which is suitable for use as a seasoning. When using the crystalline mass of this invention as seasoning, its mesh size is desirably over 35, and more preferably 65 to 150. As the crystals are usually rod-shaped, the product is still perceivable with naked eyes as crystal even in case of its having a mesh size ranging from 150 to 200.

The following shows the merits of this invention:

(1) The product is obtainable in a high yield;
(2) The process for preparing the objective product is simple;
(3) Mother liquor may repeatedly be re-used;
(4) The product is rod-shaped, glassy, hard, dry and of very good appearance;
(5) The content of disodium salt of 5'-nucleotide in the product is substantially 2–10% by weight, which is most suitable as seasoning condiment;
(6) The balance between the amount of alkali salt of IMP and GMP in the product tends to be maintained; and
(7) The product has a mesh size ranging from 20 to 200.

All these merits are attributable to the employment of hydrophilic organic solvent. More concretely stated, the supersaturation of the metastable supersaturated solution in this invention is larger than that in the plain aqueous supersaturated solution, and the metastable supersaturated state in this invention is maintained in a wide range as much as that in plain water. As a result, the crystallization in the method of this invention proceeds smoothly to produce the objective crystalline mass in a good yield, i.e. 80–90% in general. On the other hand, when crystallization is brought about from aqueous solution, the yield is only 50 to 55% at the most. Accordingly, the cost for the equipment is much lowered, usually to ⅔, procedures for recovery of the starting materials and the treatment of the mother liquid are also simplified, and the loss of alkali salt of 5'-nucleotide during the process is small, as compared with the case where the plain aqueous solution is employed.

Further, even the presence of contaminant such as coloring agent does not give any adverse effect in obtaining product of high quality by the method of this invention. Further, the mother liquor recovered is employable repeatedly as it is, so that loss of expensive alkali salt of 5'-nucleotide is small.

Further, in this invention, with progress of the crystallization, the concentration of the mother liquor becomes lower to make the crystallization velocity slower in comparison with the crystallization from plain water, so that the surface of the product is made glassy, hard and dense. In addition, heightening of the fluidity of the mother liquor makes the collection of the crystalline mass of this invention easier, so that a product of good appearance is obtainable.

The following examples are given for the purpose of illustrating embodiments of this invention, it being understood that modifications and variations of the examples described in the specification are included in the scope of the invention. Throughout the specification, the abbreviations "g.," "ml.," "mμ," "l." and "kg." mean respectively "grams," "milliliters," "millimicrons," "liters" and "kilograms," and mesh size is represented by the Japanese Industrial Standard. MSG contains usually one mole of crystal water per molecule and alkali salt of 5'-nucleotide usually seven moles of crystal water per molecule.

In the specification and claims, for the convenience of calculation, the amount of MSG is expressed as containing one mole per molecule of crystal water, while the amount of alkali salt of 5'-nucleotide is shown on anhydrous basis, i.e, as containing no crystal water.

EXAMPLE 1

A solution containing 300 g. of MSG, 12.35 g. of disodium salt of IMP and 11.8 g. of disodium salt of GMP in 300 g. of water is concentrated to 520 g. and cooled gradually under gentle stirring. When the temperature of the solution becomes 63° C., 135 ml. of methanol is added dropwise to the solution under gentle stirring, while keeping the temperature constant. Then the solution is cooled gradually under stirring to 25° C. in 20 hours, whereby 255 g. of rod-shaped crystals are obtained. These crystals are homogeneously composed of MSG, disodium salt of IMP and disodium salt of GMP, the quantity of IMP salt being 3.06% by weight and the quantity of GMP salt being 2.09% by weight. The yield is 78.6% by weight. Of the crystals thus obtained, 85% by weight are of 35 to 200 mesh size.

EXAMPLE 2

Crude 5'-nucleotide containing 4.12 kg. of disodium salt of IMP and 3.84 kg. of disodium salt of GMP, is added to an aqueous solution containing 120 kg. of MSG. The solution is concentrated to 205 kg. and is cooled gradually under gentle stirring. When the temperature of the solution becomes 65° C., 50 liters of methanol is added dropwise under gentle stirring. The mixture is cooled gradually under gentle stirring to 25° C., whereby 110 kg. of beautiful crystals are obtained. These crystals are homogeneously composed of MSG, disodium salt of IMP and disodium salt of GMP, the quantity of IMP salt being 2.66% by weight and the quantity of GMP salt being 1.78% by weight. The yield is 86% by weight and time required for the crystallization is 15 hours. Of the crystals thus obtained, 85% by weight are of 35 to 200 mesh size.

EXAMPLE 3

A mixture of 202 g. of crude MSG with crude 5'-nucleotide containing 7.8 g. of disodium salt of IMP and 7.4 g. of disodium salt of GMP, is dissolved in water. The solution is concentrated to 400 g. and is cooled to 60° C. After the addition of 45 ml. of methanol dropwise under gentle stirring, the solution is again cooled gradually under gentle stirring to 25° C., whereby 115 g. of the crystals are obtained. These crystals are homogeneously composed of MSG, disodium salt of IMP and disodium salt of GMP, the quantity of IMP salt being 5.40% by weight and the quantity of GMP salt being 3.58% by weight. The yield is 53% by weight and the time required for the crystallization is 18 hours. Of the crystals thus obtained, 80% by weight has 35 to 200 mesh size.

EXAMPLE 4

14 grams of disodium salt of IMP is dissolved in an aqueous solution of 186 g. of MSG. The solution is concentrated to 350 g. and is cooled to 65° C. After the addition of 120 ml. of methanol dropwise under stirring, the solution is cooled gradually under gentle stirring to 25° C., whereby 164 g. of crystals are obtained. The crystals are homogeneously composed of MSG and disodium salt of IMP, the quantity of the latter being 6.23% by weight. The yield is 82% by weight, and the time required for the crystallization is 16 hours. Of the crystals thus obtained, 80% by weight are of 35 to 200 mesh size.

EXAMPLE 5

10.6 grams of diammonium salt of GMP is dissolved in an aqueous solution of 190 g. of MSG. The solution is concentrated to 323 g. and is gradually cooled to 65° C. under stirring. Then 50 ml. of methanol is added dropwise under gentle stirring and the solution is cooled gradually to 25° C., whereby 146 g. of crystals are obtained. The crystals are homogeneously composed of MSG and disodium salt of GMP, the quantity of the latter being 3.73% by weight. Yield is 72.6% by weight and the time required for the crystallization is 15 hours.

EXAMPLE 6

A mixture of 109.5 g. of MSG and 8.4 g. of magnesium salt of IMP is dissolved in water. The aqueous solution is concentrated to make the total volume 195 g., then the solution is adjusted to 65° C., followed by addition of 40 ml. of ethanol thereto dropwise under gentle stirring. Though there is a partial separation of ethanol from water at first, the mixture becomes homogeneous with the progress of the crystallization. The solution is cooled under gentle stirring and when the temperature of the solution becomes 25° C., the resultant crystals are collected. The yield is 85 g. (72% by weight). The crystals are homogeneously composed of MSG and disodium salt of IMP, the quantity of the latter in the mass being 3.5% by weight. The time required for crystallization is 14 hours.

EXAMPLE 7

420 grams of an aqueous solution containing 232.5 g. of MSG, 12.5 g. of disodium salt of IMP, 2.5 g. of disodium salt of 5'-uridylic acid and 2.5 g. of disodium salt of 5'-cytidylic acid is adjusted to 75° C., followed by the addition, little by little, of 170 ml. of dioxane. The solution is gradually cooled under stirring. When the solution is cooled to 25° C., the resultant crystals are collected. The yield is 183 g. (73% by weight). The crystals are homogeneously composed of MSG and disodium salt of IMP, the quantity of the latter in the mass being 4.5% by weight. 5'-uridylic acid or 5'-cytidylic acid or their alkali salt is not detectable in the product. The time required for the crystallization is 15 hours.

EXAMPLE 8

Crude 5'-nucleotide containing 11.2 g. of disodium salt of IMP, 10.8 g. of disodium salt of GMP, 5.5 g. of disodium salt of 5'-uridylic acid and 5.5 g. of 5'-cytidylic acid is dissolved in an aqueous solution containing 250 g. of MSG followed by concentrating the whole mixture to make its total weight 464 g. When the solution becomes 60° C., 80 ml. of methanol is added dropwise under gentle stirring. The solution is gradually cooled under gentle stirring. When the solution is cooled to 25° C., the resultant crystals are collected. The yield is 185 g. (65.5% by weight). The time required for the crystallization is 14 hours. The crystals are homogeneously composed of MSG, disodium salt of IMP and disodium salt of GMP. Neither 5'-uridylate nor 5'-cytidylate is detectable in the product. Of the crystalline mass, 89% by weight is of 35 to 200 mesh size.

EXAMPLE 9

A mixture of 114 g. of MSG and 6 g. of crystalline 5'-nucleotide containing 2.53 g. of disodium salt of IMP and 2.17 g. of disodium salt of GMP is dissolved in 200 ml. of water, followed by concentrating the whole mixture to make its weight 200 g. To the solution 20 ml. of dimethylsulfoxide is added dropwise under gentle stirring at 65° C. and cooled to 25° C. gradually under gentle stirring, whereby 80 g. of beautiful crystals are obtained. The crystals are homogeneously composed of MSG, disodium salt of IMP and disodium salt of GMP, the quantity of IMP salt being 2.38% by weight and the quantity of GMP salt being 1.52% by weight. The time required for the crystallization is 20 hours and yield is 68.5% by weight. Of the crystalline mass, 89% by weight is of 35 to 200 mesh size.

Having thus disclosed the invention, what is claimed is:

1. A method for preparing flavor-enhancing crystals, each of which homogeneously consists of substantially from 2 to 10% by weight on anhydrous basis of disodium salt of flavorous 5'-nucleotide and monosodium glutamate, said crystals being effectively convertible as a unitary entity into the liquid phase in aqueous aluminum salt solution at about pH 6 without perceptible formation of precipitate, even when viewed under the microscope, which method comprises the steps of preparing a hot aqueous solution of alkali salt of flavorous 5'-nucleotide and monosodium glutamate in an amount of 20 to 62% by weight in which the ratio by weight of alkali salt of flavorous 5'-nucleotide to monosodium glutamate is 2 to 12:100 and at a temperature higher than 40° C., adding gradually from 10 to 75% by volume of a freely water-miscible organic solvent to the hot aqueous solution under gentle stirring while avoiding rapid drop of the local temperature of the hot solution, gradually lowering the temperature of the aqueous mixture at a rate of about 1 to 3 degrees centigrade per hour, and collecting the resulting crystalline material from the aqueous mixture.

2. The method claimed in claim 1, wherein the alkali salt of flavorous 5'-nucleotide is water-soluble alkali salt selected from the group consisting of sodium salt of 5'-guanylic acid, potassium salt of 5'-guanylic acid, ammonium salt of 5'-guanylic acid, sodium salt of 5'-inosinic acid, potassium salt of 5'-inosinic acid, ammonium salt of 5'-inosinic acid, magnesium salt of 5'-inosinic acid and mixtures thereof.

3. The method claimed in claim 1, wherein the freely water-miscible organic solvent is a member selected from the group consisting of methanol, ethanol, acetone, ethyleneglycol, dioxane, dimethylformamide and dimethylsulfoxide.

4. The method claimed in claim 1, wherein the 5'-nucleotide is hydrolyzate of nucleic acid per se.

References Cited
UNITED STATES PATENTS

| | | | |
|---|---|---|---|
| 1,035,591 | 8/1912 | Ikeda et al. | 99—16 |
| 1,950,459 | 3/1934 | Seifert | 99—143 X |
| 2,868,654 | 1/1959 | Haynes | 99—143 |
| 3,104,171 | 9/1963 | Sakaguchi et al. | 99—140 N |
| 3,109,741 | 11/1963 | Toi et al. | 99—16 X |
| 3,157,636 | 11/1964 | Sanno et al. | 195—28 N |
| 3,190,877 | 6/1965 | Ishibashi et al. | 99—140 N |

ALVIN E. TANENHOLTZ, Primary Examiner